US009356917B2

(12) United States Patent
Balasaygun et al.

(10) Patent No.: US 9,356,917 B2
(45) Date of Patent: May 31, 2016

(54) SYSTEM AND METHOD FOR END-TO-END ENCRYPTION AND SECURITY INDICATION AT AN ENDPOINT

(75) Inventors: Mehmet Balasaygun, Freehold, NJ (US); Jean Meloche, Madison, NJ (US); Heinz Teutsch, Green Brook, NJ (US); Shalini Yajnik, Berkeley Heights, NJ (US)

(73) Assignee: Avaya Inc., Basking Ridge, NJ (US)

( * ) Notice: Subject to any disclaimer, the term of this patent is extended or adjusted under 35 U.S.C. 154(b) by 966 days.

(21) Appl. No.: 13/571,098

(22) Filed: Aug. 9, 2012

(65) Prior Publication Data

US 2015/0304288 A1    Oct. 22, 2015

Related U.S. Application Data

(60) Provisional application No. 61/615,149, filed on Mar. 23, 2012.

(51) Int. Cl.
*H04L 29/06* (2006.01)

(52) U.S. Cl.
CPC .......... *H04L 63/0464* (2013.01); *H04L 63/166* (2013.01)

(58) Field of Classification Search
None
See application file for complete search history.

(56) References Cited

U.S. PATENT DOCUMENTS

| | | | |
|---|---|---|---|
| 6,577,599 B1 | 6/2003 | Gupta et al. | |
| 6,940,821 B1 | 9/2005 | Wei et al. | |
| 7,310,334 B1 | 12/2007 | Fitzgerald et al. | |
| 7,356,687 B2 * | 4/2008 | Medvinsky | ........... H04L 63/062 713/151 |
| 7,519,006 B1 | 4/2009 | Wing | |
| 2003/0065917 A1 * | 4/2003 | Medvinsky | ............. G06F 21/10 713/160 |
| 2003/0072269 A1 | 4/2003 | Teruhi et al. | |

(Continued)

FOREIGN PATENT DOCUMENTS

| | | |
|---|---|---|
| EP | 2093948 | 2/2008 |
| EP | 2297901 | 3/2011 |

(Continued)

OTHER PUBLICATIONS

Perkins C ED, "RTP Audio and Video for the Internet, passage," Jan. 1, 2003, RTP Audio and Video for the Internet, Boston, MA, Addison-Wesley, US, pp. 95-111 XP002439431, ISBN: 978-0-672-32249-5.

(Continued)

*Primary Examiner* — Michael R Vaughan
(74) *Attorney, Agent, or Firm* — Sheridan Ross P.C.

(57) ABSTRACT

Disclosed herein are systems, methods, and non-transitory computer-readable storage media for implementing real-time transport control protocol to obtain an end-to-end encryption and security status of a communication session. The system collects real-time transport control protocol messages associated with a communication session, wherein the real-time transport control protocol messages are generated by devices in the communication session, and wherein the real-time transport control protocol messages include security information associated with the communication session. Then, based on the real-time transport control protocol messages, the system determines a security status associated with the communication session. The system can also generate an indication of the security status associated with the communication session. Further, the system can generate an indication of the security status of a communication session on a per participant basis.

20 Claims, 8 Drawing Sheets

(56) References Cited

U.S. PATENT DOCUMENTS

| | | |
|---|---|---|
| 2003/0142625 A1 | 7/2003 | Wan et al. |
| 2003/0156550 A1 | 8/2003 | Burmeister et al. |
| 2003/0221099 A1 | 11/2003 | Medvinsky et al. |
| 2004/0057420 A1 | 3/2004 | Curcio et al. |
| 2004/0073641 A1 | 4/2004 | Minhazuddin et al. |
| 2004/0095939 A1 | 5/2004 | Yang |
| 2004/0158704 A1 | 8/2004 | Oates et al. |
| 2005/0005020 A1 | 1/2005 | Rey et al. |
| 2005/0160152 A1 | 7/2005 | Selin et al. |
| 2005/0243733 A1 | 11/2005 | Crawford et al. |
| 2006/0227717 A1 | 10/2006 | Van den Berg et al. |
| 2006/0268300 A1* | 11/2006 | Suzuki ............... H04N 7/141 358/1.9 |
| 2006/0268845 A1 | 11/2006 | He et al. |
| 2006/0285149 A1 | 12/2006 | Dei |
| 2007/0115963 A1 | 5/2007 | Vadlakonda et al. |
| 2007/0157026 A1* | 7/2007 | Zimmermann ....... H04L 9/0844 713/171 |
| 2007/0230361 A1 | 10/2007 | Choudhury |
| 2007/0280127 A1 | 12/2007 | Connor et al. |
| 2008/0002576 A1 | 1/2008 | Bugenhagen et al. |
| 2008/0031145 A1 | 2/2008 | Ethier et al. |
| 2008/0062887 A1 | 3/2008 | Parolkar et al. |
| 2008/0069002 A1 | 3/2008 | Savoor et al. |
| 2008/0147658 A1* | 6/2008 | Singh ............... G06Q 30/0603 |
| 2008/0162714 A1 | 7/2008 | Pettersson |
| 2008/0205390 A1 | 8/2008 | Bangalore et al. |
| 2009/0080336 A1 | 3/2009 | Zhang et al. |
| 2009/0135724 A1 | 5/2009 | Zhang et al. |
| 2009/0135735 A1 | 5/2009 | Zhang et al. |
| 2009/0219825 A1 | 9/2009 | Denby et al. |
| 2009/0254970 A1* | 10/2009 | Agarwal ............ H04L 63/1425 726/1 |
| 2009/0257361 A1 | 10/2009 | Deshpande et al. |
| 2010/0150003 A1 | 6/2010 | Andreasen et al. |
| 2010/0198979 A1 | 8/2010 | Pickens et al. |
| 2010/0220195 A1 | 9/2010 | Li et al. |
| 2011/0176427 A1 | 7/2011 | Huang et al. |
| 2011/0222403 A1 | 9/2011 | Suh et al. |
| 2011/0289538 A1 | 11/2011 | Begen et al. |
| 2012/0014378 A1 | 1/2012 | Zaencker |
| 2012/0147759 A1 | 6/2012 | Ratnakar et al. |
| 2013/0185062 A1 | 7/2013 | Krishnan et al. |
| 2013/0235728 A1 | 9/2013 | Le et al. |
| 2013/0250779 A1* | 9/2013 | Meloche ............ H04L 41/5067 370/248 |
| 2013/0250786 A1* | 9/2013 | Balasaygun ........ H04L 41/5032 370/252 |
| 2014/0096198 A1* | 4/2014 | Brunson ............ H04L 63/0281 726/4 |
| 2014/0338006 A1* | 11/2014 | Grkov ................ H04L 63/14 726/35 |

FOREIGN PATENT DOCUMENTS

| | | |
|---|---|---|
| GB | 2476077 | 6/2011 |
| JP | 2005073211 | 3/2005 |
| WO | WO 2009/155971 | 6/2008 |
| WO | WO 2011/1122043 | 3/2011 |

OTHER PUBLICATIONS

Schulzrinne et al., RFC 1889, Jan. 1996.
Schulzrinne et al., RFC 1890, Jan. 1996.
U.S. Appl. No. 13/485,245, filed May 31, 2012, Meloche et al.
U.S. Appl. No. 13/606,853, filed Sep. 7, 2012, Balasaygun et al.

* cited by examiner

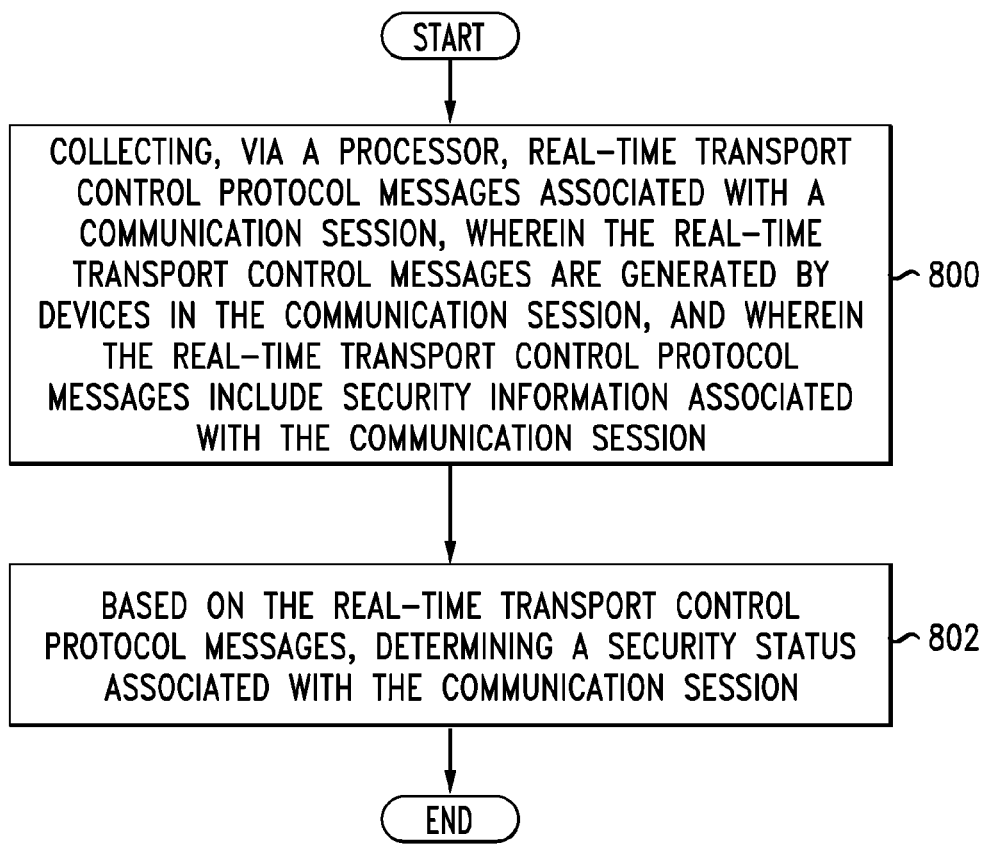

_US 9,356,917 B2_

SYSTEM AND METHOD FOR END-TO-END ENCRYPTION AND SECURITY INDICATION AT AN ENDPOINT

PRIORITY CLAIM

The present application claims the benefit of U.S. Provisional Patent Application No. 61/615,149, filed Mar. 23, 2012, which is incorporated herein by reference in its entirety.

The present application is related to U.S. Non-provisional application Ser. No. 13/606,853, filed Sep. 7, 2012; and U.S. Non-provisional application Ser. No. 13/485,245, filed May 31, 2012; which are incorporated herein by reference in their entirety.

BACKGROUND

1. Technical Field

The present disclosure relates to real-time transport control protocol and more specifically to implementing real-time transport control protocol to obtain an end-to-end encryption and security status of a communication session.

2. Introduction

Understanding media security conditions in a communication session can be an extremely difficult task. When users seek the encryption and security status of a call, they are typically unable to obtain the necessary information to make an accurate assessment of the end-to-end security status of the call, particularly as the size and complexity of the call increases. Without the necessary end-to-end security information, users are left with few—mostly imprecise—options, such as guessing the security status of the call, or simply assuming the call is insecure and unencrypted. All too often, users are left blind to the security conditions of the call. And to complicate matters for the user, the security conditions of the call can change throughout the life of the call, which further erodes the accuracy of the users security estimate. Overall, the process can be long and the experience frustrating and the outcome costly.

Engineers similarly have great difficulty identifying the security and encryption status of a call. Identifying the security and encryption status of a call is a formidable challenge precisely because the availability of relevant information is scarce: gathering the necessary information to perform a thorough analysis can be an expensive and onerous proposition. For example, often times, an engineer will attempt to ascertain the security and encryption status of a call. The engineer begins the process by trying to understand the conditions. What is the model of the endpoint being used? Is it a handset or a speaker phone? Does the endpoint have a direct media path to the far end, or is there a media gateway deployed in the media path? Is the gateway transcoding? Is there a conference bridge involved? Is the call signaling path secure? Is the media path encrypted? What is the network topology? How many devices are participating on the call? Are the other devices using encryption? Answers to these and many other questions are essential to identifying the security status of a call. Yet, currently, there are no existing tools that push this information out to the phones or session endpoints. Instead, engineers typically must deploy sniffers on the network to record the actual media received at a particular endpoint, an expensive and laborious process.

Real-time transport control protocol (RTCP) packets can be analyzed to obtain some relevant information. RTCP provides feedback on the media status in a real-time transport protocol (RTP) flow. In particular, RTCP packets provide a summary of the media quality and characteristics over a single hop of the media path. However, except in the limited case of a pair of endpoints with a direct media path, the end-to-end media traverses through multiple hops. Consequently, RTCP packets generally do not provide an end-to-end summary of the session. Moreover, RTCP packets do not provide much of the relevant encryption and security information needed to ascertain the true security and encryption conditions of the call. Thus, engineers do not have effective tools or techniques for determining the end-to-end security and encryption status of a media session. And while security for a media session is experienced on an end-to-end basis, engineers are unable to determine which element in the network path may have a different encryption and/or security status.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein provide a fast, efficient, and scalable technique for implementing real-time transport control protocol to obtain an end-to-end encryption and security status of a communication session. These approaches allow users and engineers to obtain link-by-link, end-to-end encryption and security information in a fast and cost-effective manner. The end-to-end encryption and security information can provide an overall view of the communication session, including encryption information, as well as a security summary of each hop involved in the communication session. This information can greatly facilitate the network and security monitoring and troubleshooting process, and inform the users on the encryption and security status of the call. Moreover, end-to-end information can be used to quickly identify the precise point of security weakness in the network path and the overall security strength of the communication session. The end-to-end information can also be used to alert users of a change in the call's encryption and security status.

Disclosed are systems, methods, and non-transitory computer-readable storage media for implementing real-time transport control protocol to obtain an end-to-end security status of a communication session. The system collects real-time transport control protocol messages associated with a communication session, wherein the real-time transport control protocol messages are generated by devices in the communication session, and wherein the real-time transport control protocol messages include security information associated with the communication session. The real-time transport control protocol messages can also include a differentiated services trace, a global session identifier, a transcoding and gain table, a signal strength, a topology, an access mode, a real-time transport control protocol packet, encryption information, hardware information, hop-by-hop information, network characteristics, user information, device capabilities, protocol information, session characteristics, etc. Moreover, the security information can include security factors, such as device capabilities, protocol information, user identity, encryption status, encryption strength, encryption characteristics, network topology, authentication information, playout device characteristics, communication attributes, hardware information, security protections, traffic statistics, access mode, etc.

The real-time transport control protocol messages can be configured to propagate along the communication session. To this end, the real-time transport control protocol messages can include instructions for relaying the real-time transport control protocol messages. Further, each of the devices in the communication session can be configured to relay a respective real-time transport control protocol message along the communication session. Each of the devices in the communication session can also be configured to relay a respective real-time transport control protocol message to a central location. In addition, each of the devices in the communication session can collect one or more real-time transport control protocol messages from other devices in the communication session and/or a central location.

Next, based on the real-time transport control protocol messages, the system determines a security status associated with the communication session. The security status can include an encryption status, an encryption strength, a privacy indication, an information sensitivity, an authentication status, an authorization status, an identity, a network property, a communication property, a device property, a security level, a threat level, a physical security, playout device characteristics, protocol information, session characteristics, etc. Moreover, the security status can correspond to the overall communication session and/or a path in the communication session. The security status can also correspond to a participant in the communication session, for example, when multiple participants are joined on a conference call. In one aspect, the system determines a respective security status for each participant in the communication session based on the real-time transport control protocol messages.

The system can also generate an indication of the security status associated with the communication session. The indication can include an alert, a sound, an image, a diagram, a report, a display, a feature, a response, a message, a visual representation, a multimedia presentation, a list, a description, a summary, a file, a modified graphical element, an announcement, an animation, an emphasis, an attribute, etc. The indication can also include a modification, such as a change to a characteristic of a video, a sound, a text, a character, a symbol, a number, and/or an image. Further, the system can play, display, present, transmit, and/or output the indication, for example. The system can display the indication on the system, project the indication on an object for display, and/or transmit the indication to another device for display. For example, the system can display a representation of the security status of the communication session on a screen. The indication can be generated and/or displayed according to a display scheme. The display scheme can define various aspects of the indication and/or how the indication is displayed. For example, the display scheme can provide an outline, a structure, a pattern, a format, a condition, an attribute, an instruction, an element, an order, an arrangement, an organization, etc., of the indication and/or a display of the indication.

The system can collect the real-time transport control protocol messages in response to a triggering event. Similarly, the system can determine the security status and/or generate the indication in response to a triggering event. A triggering event can include, for example, a request, a network change, a configuration, a software and/or hardware change, a task, a rule, a command, a communication, a media problem, a setting, a transmission, a parameter, a flag, a signal, a threshold, a status, a schedule, a message, an acknowledgment, an instruction, an alert, an error, an input, and so forth. For example, the triggering event can be a push of a button by a user to initiate the collection of the real-time transport control protocol messages and/or the indication of the security status of the communication session.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 8 illustrates an exemplary method embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for accurately and efficiently determining end-to-end security information. A system, method and non-transitory computer-readable media are disclosed for implementing real-time transport control protocol to obtain an end-to-end security status of a communication session. A brief introductory description of a basic general purpose system or computing device in FIG. 1, which can be employed to practice the concepts, is disclosed herein. A more detailed description of the end-to-end real-time transport control protocol architectures in FIGS. 2-4 will then follow. The discussion then turns to the example configuration in FIG. 5, the exemplary algorithm in FIG. 6, and the exemplary display scheme in FIG. 7. Finally, the discussion turns to the exemplary method shown in FIG. 8. These variations shall be discussed herein as the various embodiments are set forth.

Figure 1:
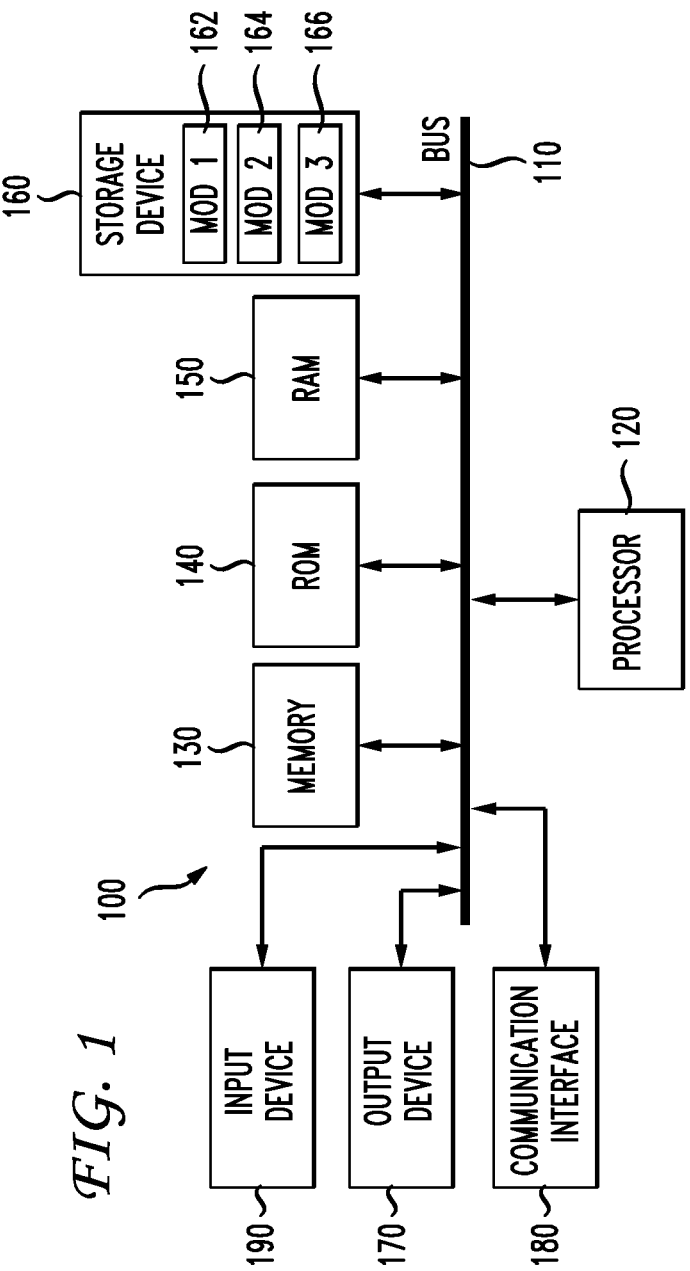
FIG. 1 illustrates an example system embodiment.

The disclosure now turns to FIG. 1. With reference to FIG. 1, an exemplary system includes a general-purpose computing device 100, including a processing unit (CPU or processor) 120 and a system bus 110 that couples various system components including the system memory 130 such as read only memory (ROM) 140 and random access memory (RAM) 150 to the processor 120. The computing device 100 can include a cache 122 of high speed memory connected directly with, in close proximity to, or integrated as part of the processor 120. The computing device 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the computing device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
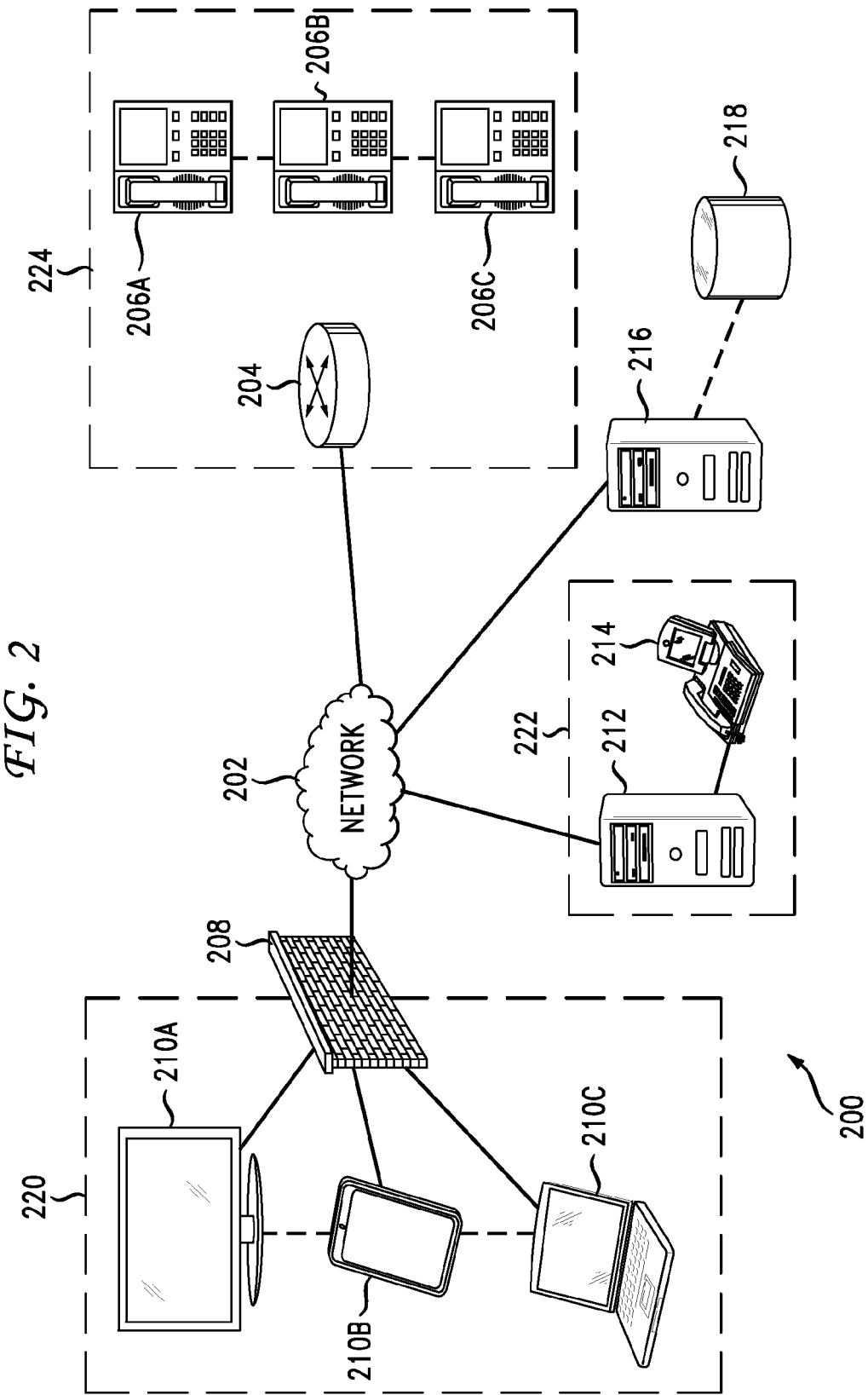
FIG. 2 illustrates an exemplary end-to-end real-time transport control protocol architecture.

Having disclosed some components of a computing system, the disclosure now turns to FIG. 2, which illustrates an exemplary end-to-end real-time transport control protocol architecture 200. Real-time transport control protocol (RTCP) is an extensible protocol that lends itself to both standard and proprietary extensions. To this end, an RTCP extension is implemented in the end-to-end RTCP architecture 200 to provide an indication to media engines involved throughout a call topology that RTCP information needs to be forwarded to one or more destinations.

In FIG. 2, the router 204, the firewall 208, and the servers 212, 216 communicate via network 202. The network 202 can include a public network, such as the Internet, but can also include a private or quasi-private network, such as an intranet, a home network, a virtual private network (VPN), a shared collaboration network between separate entities, etc. The principles set forth herein can be applied to many types of networks, such as local area networks (LANs), virtual LANs (VLANs), corporate networks, wide area networks, and virtually any other form of network.

The voice over IP (VoIP) terminals 206A, 206B, 206C communicate with the network 202 via the router 204, the media devices 210A, 210B, 210C communicate with the network 202 via the firewall 208, and the IP video phone 214 communicates with the network 202 via the Session Initiation Protocol (SIP) server 212. The VoIP terminals 206A, 206B, 206C and the media devices 210A, 210B, 210C can include virtually any device with networking capabilities, such as computers, phones, video game consoles, conferencing systems, network media players, etc. In FIG. 2, network device 210A is an IP television, network device 210B is a smart phone, and network device 210C is a laptop computer.

The terminals 206A, 206B, 206C, 210A, 210B, 210C, 214 and the network components 204, 208, 212, 216 can communicate real-time transport control protocol (RTCP) packets with other terminals and network components. The RTCP packets can include RTCP extensions, RTCP data, and/or RTCP reports. The RTCP extensions, RTCP data, and/or RTCP reports can include instructions for transmitting RTCP information, such as encryption and security information, based on a triggering event. The instructions for transmitting RTCP information can be configured to propagate along the communication session. For example, the terminals 206A, 206B, 206C, 210A, 210B, 210C, 214 and network components 204, 208, 212, 216 can be configured to propagate the instructions to other terminals and network components in the communication session. The instructions can then instruct the terminals 206A, 206B, 206C, 210A, 210B, 210C, 214 and network components 204, 208, 212, 216 to propagate RTCP information along the communication session, based on rules, settings, and/or conditions provided by the instructions. This way, the devices involved in the communication session are able to automatically transmit the RTCP information throughout the communication session.

The instructions can include, for example, a field, a signal, a header, a flag, a message, a report, a rule, an indication, data, etc. Moreover, the instructions can include multiple rules for transmitting RTCP information according to different triggering events. Also, the instructions can include rules specifying the destination address used in transmitting the RTCP information. In one embodiment, the instructions include a list of destination addresses and rules for selecting a destination address from the list. For example, the instructions can specify an IP address as a destination address for periodically transmitting RTCP information, and a different IP address as the destination address for transmitting RTCP information when a threshold is exceeded. In another embodiment, the instructions specify an IP address and port number as the destination address for transmitting RTCP information to nodes residing in the same network segment, and a different IP address and/or port number as the destination address for transmitting RTCP information to nodes residing in other network segments. The instructions can also include alternative addresses for redundancy and flexibility. In addition, the instructions can include settings, rules, conditions, parameters, policies, commands, and/or tags defining what RTCP information to propagate. For example, the instructions can include rules for propagating a signal strength, a topology, flow statistics, delay information, a media quality, jitter information, codec information, and packet loss information.

A triggering event can include a request, a network change, a configuration change, a hardware change, a software change, a detection, a task, a command, a communication problem, a media problem, a parameter, a threshold, a status, a schedule, an instruction, an error message, and so forth. The RTCP information can include an encryption status, an encryption strength, an encryption type, a local playback media device, a media playout characteristic, privacy information, etc. The RTCP information can also include a differentiated services trace, a global session identifier, a transcoding and gain table, a signal strength, a topology, an access mode, configuration information, routing information, flow statistics, a quality of service, status information, hardware information, hop-by-hop information, information related to network characteristics, etc.

The RTCP information can be used to generate an indication of security status associated with a path in the communication session and/or the overall communication session. The indication can include, for example, an alert, a sound, an image, a response, a message, a visual representation, an audio representation, a textual representation, a summary, an attribute, an animation, a diagram, a graphical element, a modification, etc. The information can also be used to display the security status associated with the path in the communication session. The security status can include, for example, an encryption status, a record status, an encryption strength, an encryption type, a local playback media device, a media playout characteristic, a privacy level, a security level, etc. Moreover, the RTCP information can also be used to display an indication as to whether a particular communication session is being recorded.

The RTCP information can be combined to obtain the overall security status of the communication session. The combined RTCP information can also be used to generate an end-to-end security and/or encryption representation of the communication session. For example, the RTCP information can be collected from the devices in the communication session to yield end-to-end RTCP data, which can be analyzed to generate an end-to-end RTCP security and/or encryption indication. The indication can be presented to a user and/or transmitted to a monitoring agent. Moreover, the indication can be generated based on a triggering event. Further, the indication can include an alert, a sound, an image, a message, a response, a visual representation, an audio representation, a textual representation, a summary, a diagram, a display, an announcement, an attribute, a visual emphasis, an animation, a graphical element, a modification, a report, and so forth.

RTCP data associated with multiple real-time transport protocol (RTP) streams can be integrated to provide a complete end-to-end picture of the encryption and/or security of the communication session. Normally, RTCP data is exchanged between adjacent nodes of the network topology with the purpose of providing feedback to adjacent nodes about the network performance that pertains to the RTP stream exchanged between the adjacent nodes. However, when communication traverses other network components, such as a bridge or a gateway, the end-to-end media path is divided by segments residing between the adjacent nodes. In this case, the RTCP data exchanged between adjacent nodes represent the encryption and/or security over a segment of the media path. Thus, to obtain the end-to-end encryption and/or security of the media path, the RTCP data for the multiple segments of the media paths can be integrated. In FIG. 2, RTCP data representing the encryption and security of segments 220, 222, and 224 can be integrated to obtain the end-to-end encryption and security of the media path for a communication involving all three segments 220, 222, and 224. Here, the RTCP data can be collected, for example, at one of the terminals 206A, 206B, 206C, 210A, 210B, 210C, 214; the server 216; or any other device with storage capabilities. The terminals 206A, 206B, 206C, 210A, 210B, 210C, 214 are configured to transmit the RTCP data to server 216, which serves as an RTCP collector. The server 216 can store and analyze the RTCP data to generate an end-to-end encryption and/or security indication of the communication session. The server 216 can store the RTCP data locally, or can optionally store any portion of the RTCP data in a separate database 218.

In one embodiment, the terminals 206A, 206B, 206C, 210A, 210B, 210C, 214 use the RTCP channel to communicate RTCP data, such as RTCP reports and extensions, throughout the media topology. RTCP is present throughout the media topology in any multimedia signaling scheme, such as SIP and H.323 signaling. Indeed, RTCP provides a signaling agnostic channel that can be leveraged for RTCP data propagation and dynamic provisioning as set forth herein. Thus, by using the RTCP channel, the terminals 206A, 206B, 206C, 210A, 210B, 210C, 214 can transmit RTCP data end-to-end, circumventing problems that may arise when a device is behind a firewall or a network address translation (NAT) device. For example, the RTCP data can be transmitted to and from any device behind the firewall 208 (media devices 210A, 210B, 210C) via the RTCP channel, provided that appropriate firewall pin holes are opened to allow exchange of RTCP packets bi-directionally.

Other exemplary devices which could be connected in the illustrated RTCP architecture 200 include, for example, tablet computers, hand held media players having networking capabilities, and vehicles equipped with mobile network access. Each device in the RTCP architecture 200 can be equipped with a capability to produce media communications, including audio, video, text, or any other communication format. Moreover, each device can include media engines which format and manipulate raw data into packets. In some media engines, the raw data can require modulation and manipulation to correctly format the raw data into packets; in other media engines, the raw data simply needs to be formatted and inserted into packet configurations.

As those of skill in the art will readily understand, the RTCP architecture 200 can include many other types of network components, such as bridges, switches, hubs, gateways, databases, endpoints, signaling systems, computer clusters, mixing elements, border elements, multipoint control units, and so forth.

Figure 3:
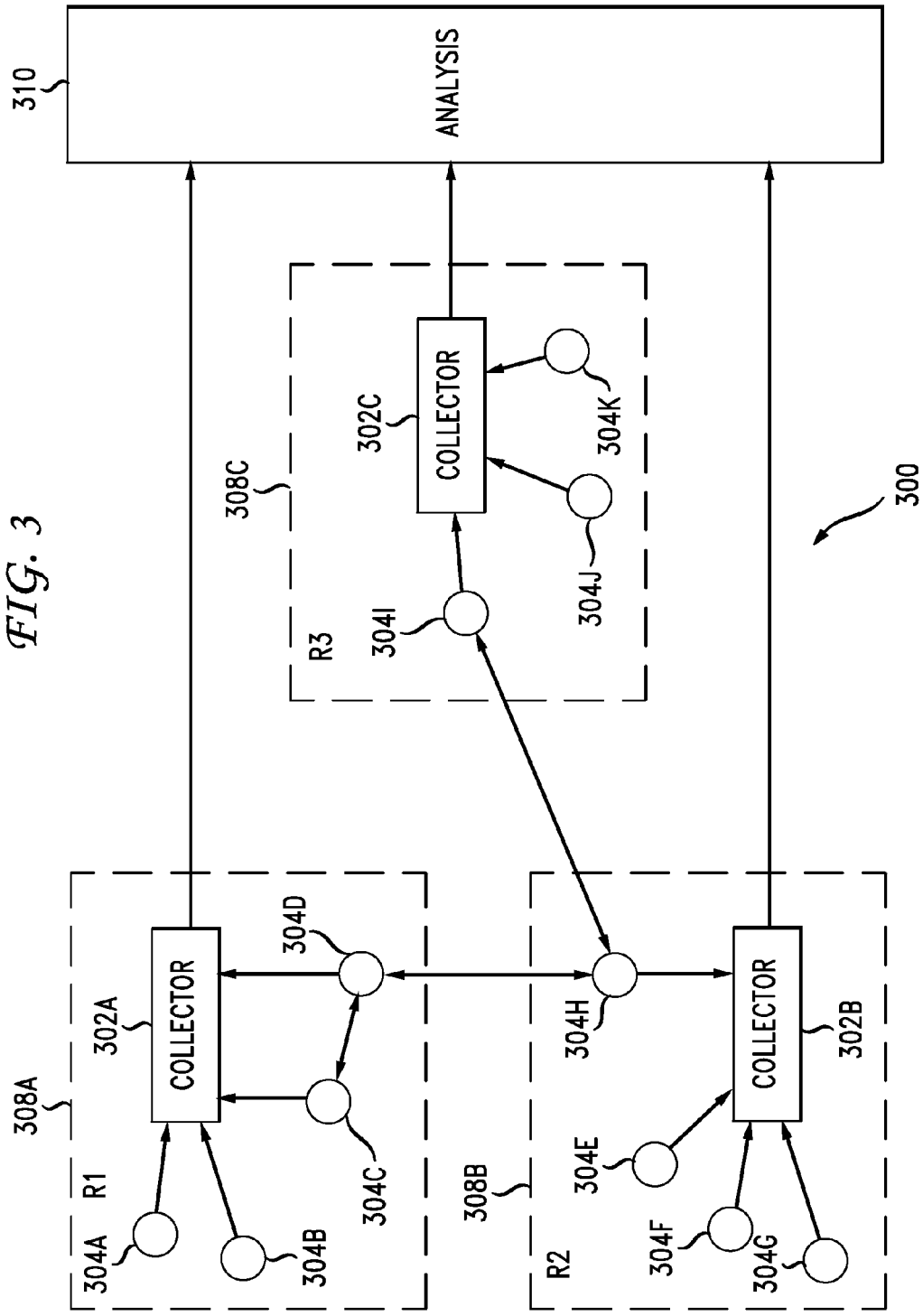
FIG. 3 illustrates an exemplary dual unicast real-time transport control protocol monitoring architecture.
Figure 4:
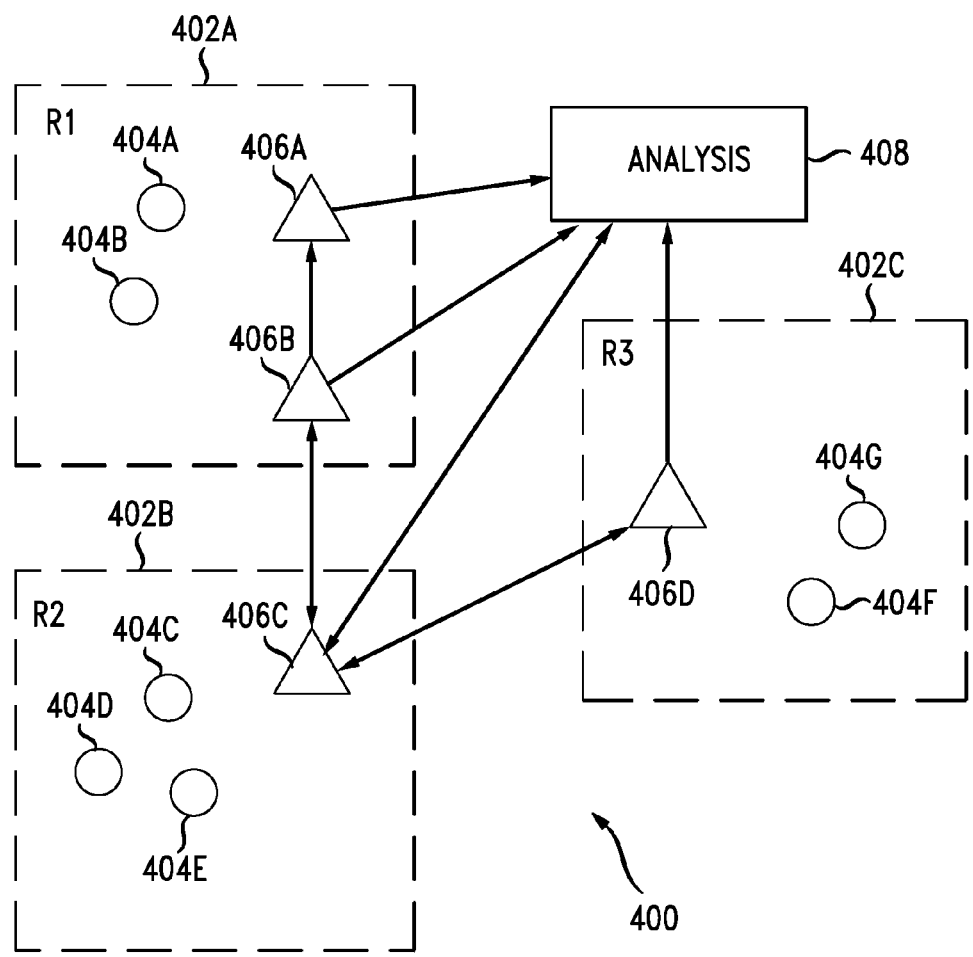
FIG. 4 illustrates an exemplary dynamic dual unicast real-time transport control protocol monitoring architecture.

The discussion now turns to the exemplary real-time transport control protocol monitoring architectures shown in FIGS. 3 and 4.

FIG. 3 illustrates an exemplary dual unicast real-time transport control protocol monitoring architecture 300. The nodes 304A-K are assigned to network regions 308A-C, and the network regions 308A-C are assigned to RTCP collectors 302A-C. The nodes 304A-K are configured to send a copy of their RTCP data to the RTCP collectors 302A-C according to their assigned network regions 308A-C. The collectors 302A-C are configured to collect the RTCP data from the nodes 304A-K and transmit the RTCP data to a centralized location 310 for analysis. The collectors 302A-C can also be configured to implement a query mechanism by which endpoints and network elements involved in an end-to-end media exchange can query the collectors 302A-C to find out about the overall media status associated with the end-to-end media session.

A node can include, for example, a voice engine, a codec, a processor, a compressor, a display, a network interface, a filter, a converter, a controller, an antenna, a bridge, a computer, a phone, a router, a playback device, an input device, a database, a software agent, a gateway, and so forth. The network regions 308A-C can include, for example, one or more networks and/or one or more network segments. The RTCP collectors 302A-C can be any device configured to receive RTCP data, such as a phone, a computer, a server, a storage device, a monitoring device, etc. Moreover, the centralized location 310 can include any device configured to analyze RTCP data. For example, an RTCP collector can be a phone, a server, a node, a computer, a database, a service level agreement (SLA) monitor, a storage device, a software agent, a cluster, a cloud, etc. The centralized location 310 can be in one of the network regions 308A-C, or a separate network and/or network region.

In FIG. 3, nodes 304A-D are assigned to region 308A, which is assigned to collector 302A. Here, nodes 304A-D are configured to send a copy of their RTCP data to collector 302A, and the collector 302A is configured to send the RTCP data from the nodes 304A-D to the centralized location 310. Nodes 304E-H are assigned to region 308B, which is assigned to collector 302B. Thus, nodes 304E-H are configured to send a copy of their RTCP data to collector 302B, which is configured to send the RTCP data from the nodes 304E-H to the centralized location 310. The nodes 304I-K are assigned to region 308C, which is assigned to collector 302C. Accordingly, nodes 304I-K are configured to send a copy of their RTCP data to collector 302C, and the collector 302C is configured to send the RTCP data from the nodes 304I-K to the centralized location 310.

The centralized location 310 receives the RTCP data from the collectors 302A-C and analyses the RTCP data to generate an end-to-end RTCP analysis. The centralized location 310 can analyze the RTCP data in response to a triggering event, such as, for example, a user request, or it can do so periodically according to, for example, a schedule and/or a parameter. The end-to-end RTCP analysis can be used to monitor a communication session, determine end-to-end security information, collect statistics, calculate an encryption status/level, determine a network topology, generate an encryption and/or security indication, determine a local playback sound device, determine privacy information, and so forth. The end-to-end RTCP analysis can also be used to generate an end-to-end summary, a session chart, an end-to-end report, and/or any representation of the encryption and/or security status of the communication session.

In one embodiment, the collectors 302A-C are configured to implement a query mechanism that allows network elements involved in a call to query the collectors 302A-C for the overall encryption and/or security status of the call. The query mechanism can be implemented using an explicit request/response message, or by making uni-directional RTCP streams to collectors bi-directional. Network elements can query the collectors 302A-C according to their network regions, for example. To illustrate, nodes 304A-D can be configured to query collector 302A to obtain information regarding the overall encryption and/or security status of the call, as nodes 304A-D and collector 302A reside on the same region (region 308A). This way, the collectors 302A-C can provide overall encryption and/or security status information they obtain from the centralized location 310 to all involved elements in their region. Network elements can also be configured to query collectors in other regions. For example, network elements can be configured to query other collectors based on a schedule, a policy, a configuration, a load, a load balancing need, a flag, a topology, etc. Similarly, the centralized location 310 can be configured to push overall encryption and/or security information to the collectors 302A-C by converting uni-directional RTCP streams from the collectors 302A-C to the centralized location 310 to bi-directional streams. The centralized location 310 can also be configured to push overall encryption and/or security information to the collectors 302A-C by implementing a query mechanism by which the collectors 302A-C can obtain information regarding the overall encryption and/or security status of a call. In some variations, the network elements inside a region do not directly talk to the centralized location 310, but let the centralized location 310 disperse overall encryption and/or security information to the collectors 302A-C, effectively creating a mechanism by which the centralized location 310 does not get overloaded with traffic from all network elements involved in the media session.

In one embodiment, the end-to-end RTCP analysis is used to generate an alert, a message, and/or an image that identifies an encryption and/or security status. For example, the end-to-end RTCP analysis can be used by a phone to display a list of devices participating in the communication session, with a visual indication of the encryption status of each device and/or the overall communication session. To illustrate, the phone in this example can display an image of a lock next to any device using encryption. The phone can also use colors, numbers, symbols, etc., to indicate the encryption strength. For example, the phone can display a red lock next to a device to indicate that the device is using 128-bit encryption. The phone can also display a green lock next to a device to indicate that the device is using 256-bit encryption.

In another embodiment, the end-to-end RTCP analysis is used to display a visual representation of the security of a communication session on a touch screen. Here, a user can interact with the communication session through the display. For example, the user can select a node to view additional details about the node. The display can include controls to allow the user to actively control the experience. For example, the user can control the type/amount of information that is collected/analyzed, the type/amount of information that is displayed, the method/format for displaying such information, etc. Through the display, the user can also perform many other functions, such as transmitting an alert/indication for other devices in the communication session, displaying information at another location, forwarding information to another device, etc.

FIG. 4 illustrates an exemplary dynamic dual unicast real-time transport control protocol monitoring architecture 400. The dynamic dual unicast RTCP monitoring process is similar to the dual unicast RTCP monitoring architecture 300; however, in the dynamic dual unicast RTCP monitoring architecture 400, the process is triggered by an event and the mechanism is distributed through the media topology that is relevant to the particular communication session. To this end, the dynamic dual unicast RTCP monitoring architecture 400 can use RTCP extensions to trigger the process and distribute the mechanism. The dynamic dual unicast RTCP monitoring architecture 400 can use the RTCP channel to distribute the RTCP extensions and any other RTCP data. This way, the RTCP extensions can be transmitted end-to-end, circumventing any problems that may arise when a node is behind a NAT, a firewall, or any other security device. Here, every node in the communication session may be reachable from every other node involved in the media path.

The RTCP extensions can include instructions to forward RTCP data in response to a triggering event, such as when a threshold is reached or a security change is detected, for example. The RTCP extensions can also include parameters, such as a number of dual unicast RTCP packets that need to be forwarded, the destination address for the dual unicast RTCP packets, etc. The RTCP extensions can also include many additional types of information. For example, the RTCP extensions can include information about security, hardware, network status, transcoding, local playback sound device, and any other aspect that is relevant for an end-to-end analysis of the encryption and/or security status of the call. The process can be triggered from any point in the media topology, at any time during the communication session. The triggering event can originate from any user or device associated with the communication session. Moreover, the triggering event can be automated or manually generated.

In FIG. 4, the dynamic dual unicast RTCP monitoring architecture 400 includes nodes 404A-G and 406A-D, which reside in multiple network regions 402A-C, and a centralized location 408 for collecting RTCP data. As one of ordinary skill in the art will readily recognize, the nodes 404A-G and 406A-D in other embodiments can reside in more or less network regions than illustrated in FIG. 4.

Nodes 406A-D represent the nodes involved in a particular communication session in the dynamic dual unicast RTCP monitoring architecture 400, and nodes 404A-G represent other nodes, which are not involved in the communication session. Here, nodes 406A-D forward RTCP data to the centralized location 408 based on forwarding instructions. The forwarding instructions propagate through the media topology that is relevant to the communication session (e.g., nodes 406A-D) to direct the relevant nodes in the media topology (e.g., nodes 406A-D).

The forwarding instructions can include instructions for forwarding RTCP data to one or more destination addresses in response to one or more triggering events. A destination address can include a port number, an IP address, a Media Access Control (MAC) address, a hostname, a uniform resource locator, an identifier, and so forth. The destination address in FIG. 4 includes an IP address and a port number associated with the centralized location 408. In one embodiment, the destination address includes one or more nodes 404A-G and 406A-D. In another embodiment, the destination address includes one or more RTCP data collectors residing in one or more networks.

The forwarding instructions can also define the amount and type of RTCP data that needs to be forwarded, as well as any other parameters associated with the forwarding mechanism. The forwarding instructions can be included in an RTP packet and/or transmitted via the RTCP channel as an RTCP extension, for example. An RTCP extension can include additional information associated with the communication session and/or nodes 406A-D, such as parameters, statistics, data, messages, descriptors, errors, options, reports, logs, characteristics, and so forth.

Further, any device involved in the communication session can operate as an RTCP collector for the communication session. For example, node 406A can operate as an RTCP collector for the communication session. Here, the nodes 406B-D can forward RTCP data to node 406A as specified in the forwarding instructions. Any other node with sufficient resources can similarly operate as an RTCP collector. In FIG. 4, the centralized location 408 operates as an RTCP collector. Accordingly, the centralized location 408 collects the RTCP data forwarded from the nodes 406A-D. The centralized location 408 can be configured to analyze the RTCP data to generate an end-to-end analysis of the communication session. The centralized location 408 can also be configured to generate an indication of the encryption and/or security status of the communication session.

The centralized location 408 can analyze the RTCP data in response to a triggering event, such as, for example, a user request, or it can do so periodically according to, for example, a schedule, a parameter, etc. The end-to-end RTCP analysis can be used to monitor a communication session, determine end-to-end security information, collect statistics, calculate an encryption status and/or level, determine a network topology, determine a security level, determine local playback devices in the communication session, determine privacy information, and so forth. The end-to-end RTCP analysis can also be used to generate an indication of the encryption and/or security status of a call and/or a communication path. Moreover, the end-to-end RTCP analysis can be used to generate an end-to-end summary, a session chart, an end-to-end report, and/or any representation of a communication session.

In one embodiment, the end-to-end RTCP analysis is used to generate an indication when a change in the security of the call is detected. For example, the end-to-end RTCP analysis can be used to generate an audible alert when an unencrypted node joins the call. As another example, the end-to-end RTCP analysis can be used by a node, such as a phone, to display a representation of the devices participating in the communication session, with a visual indication of the encryption and/or security status of each device and/or the overall communication session. To illustrate, the phone in this example can display an image of a lock next to any device using encryption. The phone can also use colors, numbers, symbols, etc., to indicate the encryption strength. For example, the phone can display a orange lock next to a device to indicate that the device is using 128-bit encryption. The phone can also display a green lock next to a device to indicate that the device is using 256-bit encryption.

In another embodiment, the end-to-end RTCP analysis is used to display a visual representation of the communication session on a touch screen. Here, a user can interact with the communication session through the display. For example, the user can select a node to view additional details about the node. The display can include controls to allow the user to actively control the experience. For example, the user can control the type/amount of information that is collected/analyzed, the type/amount of information that is displayed, the method/format for displaying such information, etc. Through the display, the user can also perform many other functions, such as transmitting an alert/indication for other devices in the communication session, displaying information at another location, forwarding information to another device, etc.

Figure 5:
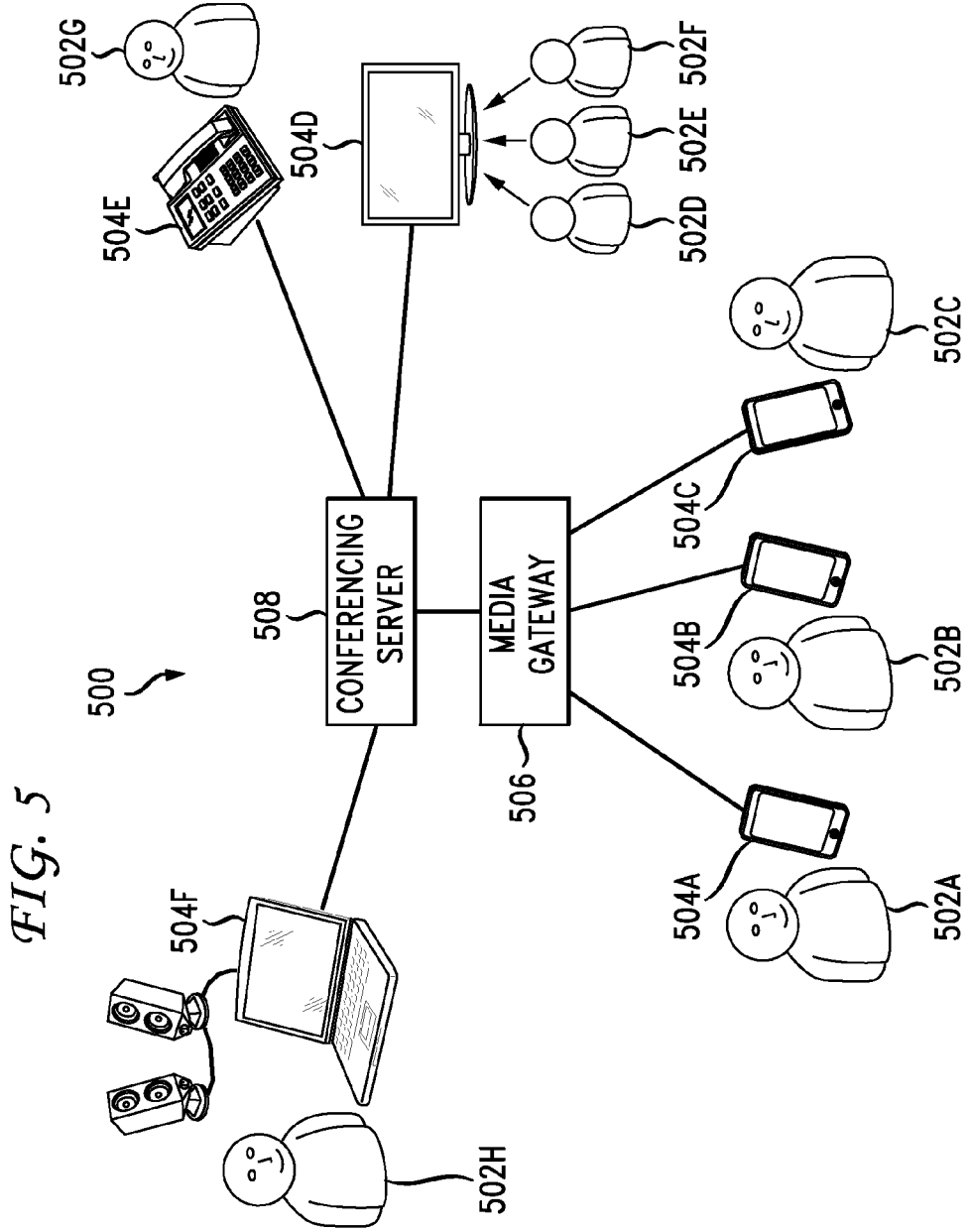
FIG. 5 illustrates an example configuration for obtaining an end-to-end encryption and security indication in an exemplary media topology.

FIG. 5 illustrates an example configuration for obtaining an end-to-end encryption and security indication in an exemplary media topology 500. The media topology 500 includes devices 504A-F, media gateway 506, and conferencing server 508. Here, users 502A-H use the devices 504A-F to participate in a conference call on the conferencing server 508. The devices 504A-F can include virtually any media device, such as a mobile phone, a laptop, a conferencing system, an IP phone, an IP television, etc. The devices 502A-C connect to the conferencing server 508 via the media gateway 506, which transcodes the media exchanges with the devices 502A-C. The devices 504A-F are configured to publish security information about their media session as extended data fields in RTCP messages. The security information can include the encryption status, recording status, encryption strength, local playback sound device, encryption type, and so forth. The devices 504A-F are also configured to transmit an RTCP update when the playout device characteristics change. For example, the devices 504A-F can send an RTCP update when one of the participants 502A-H switches from a headset to speakerphone, or vice versa.

The network elements in the media path, media gateway 506 and conferencing server 508, are configured to relay RTCP information from devices 504A-F along the communication session. If the media gateway 506 is acting as a public switched telephone network (PSTN) interface, the media traversing the media gateway is marked as unencrypted. Similarly, if the media gateway 506 is sitting at the edge of an enterprise and acting as a media gateway to an IP trunk, the media in the RTCP packets sent within the enterprise is marked as unencrypted unless the external media path can be discovered end-to-end within the enterprise. The devices 504A-F can construct an end-to-end view of the media path within the media topology 500 based on the combined RTCP information. Thus, the devices 504A-F can use the combined RTCP information to discover the media topology 500. Once the media topology 500 is discovered, the devices 504A-F can use security information provided in the RTCP information, such as encryption status information, to present an overall view of the encryption and/or security of the conference call. In addition, the devices 504A-F can provide granular encryption and/or security information on a per participant basis.

The devices 504A-F can generate an encryption and/or security indication based on an algorithm. The encryption and/or security indication can be displayed at any of the devices 504A-F, for example. In one embodiment, if a call consists of M media legs and N participating endpoints (where N<=M), a call is displayed to be encrypted only when {1, ... , M} are all encrypted, and the call is displayed to be secure when {1, ... , N} all report that speakerphone capability is not used to play out audio. Here, the endpoints are configured to report their playout device characteristics (e.g., speakerphone or not), and send an RTCP update when the playout device characteristics change. The media legs in a call can be determined based on the layer 7 media topology of the call. For example, in some aspects, if a gateway or any other element in the call is simply passing the media through (e.g., hairpinning) without decrypting the media, then that gateway or element is not considered part of the media topology and, therefore, is not defined as a media leg.

Figure 6:
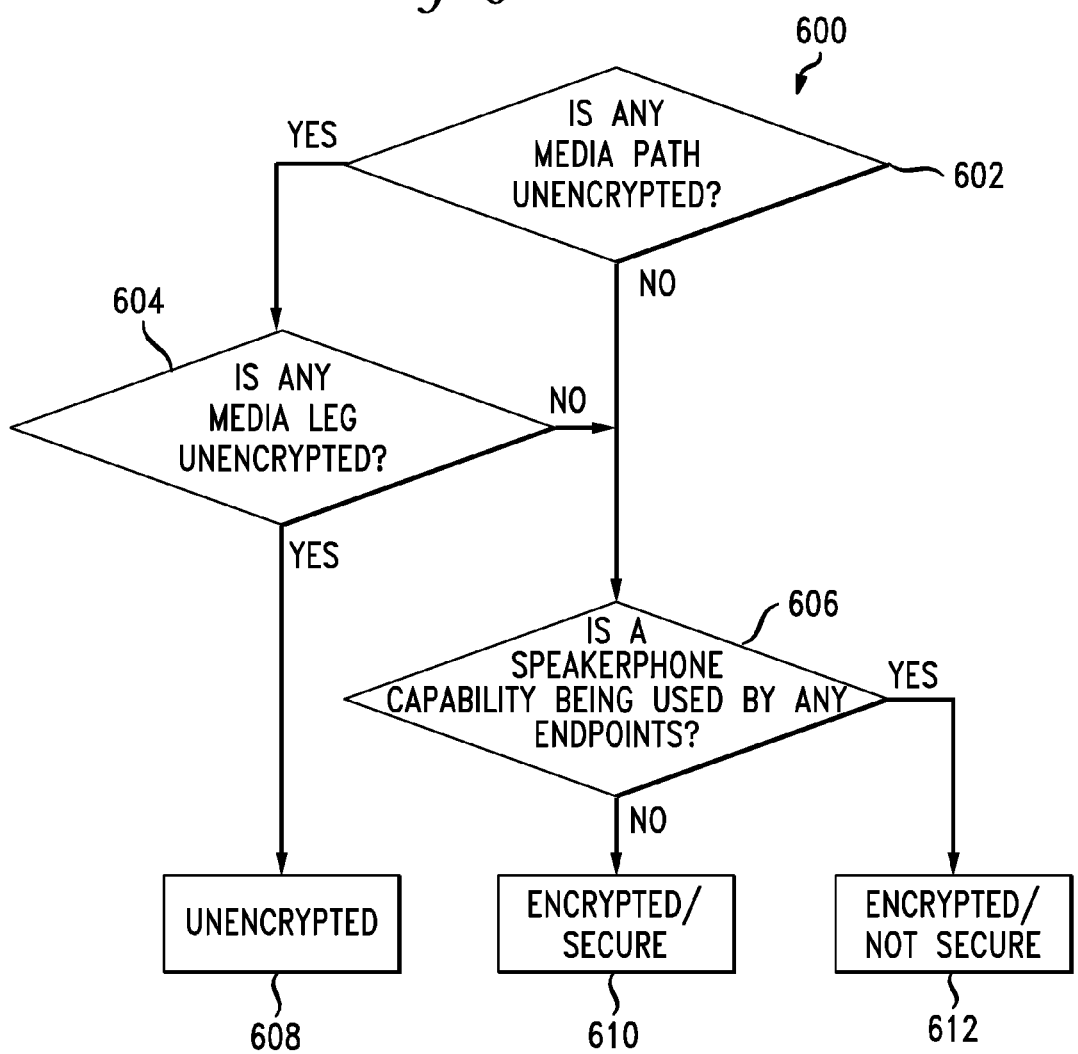
FIG. 6 illustrates an exemplary algorithm for generating an encryption and security indication.

FIG. 6 illustrates an exemplary algorithm 600 for generating an encryption and security indication. At block 602, the algorithm 600 first determines if any media path in the call is unencrypted. If any media path is determined to be unencrypted, the algorithm 600 moves to block 604 to determine if any media leg is unencrypted. At block 604, if any media leg is unencrypted, the entire call is shown as unencrypted 608. Here, the entire call is shown as unencrypted even if part of the media path uses secure real-time transport protocol (SRTP) to communicate, as the entire call's security can be compromised by the unencrypted media leg. On the other hand, if none of the media paths are unencrypted at block 602, or if none of the media legs are unencrypted at block 604, then the algorithm 600 determines at block 606 if a speaker phone capability is being used by any of the endpoints. If a speaker phone capability is being used by one or more endpoints, the entire call is shown as encrypted but not secure 612. If a speaker phone capability is not being used by one or more endpoints, the entire call is shown as encrypted and secure 610.

If an endpoint does not report its playout device mechanism in the RTCP information, then that endpoint is assumed to be using a speakerphone capability. Moreover, the encryption strength of an overall call is based on the weakest media leg of all media legs in the call. Thus, if a media leg in the call uses 128-bit encryption, and the other media legs on the call use 256-bit encryption, then the entire call is shown to be of 128-bit encryption strength. In one embodiment, the media legs in a call are determined based on the layer 7 media topology of the call. Here, if a gateway or any other element in the call is simply passing the media through the network (e.g., hairpinning) without decrypting the media, then that gateway or element is not considered part of the media topology and, therefore, is not defined as a media leg.

Figure 7:
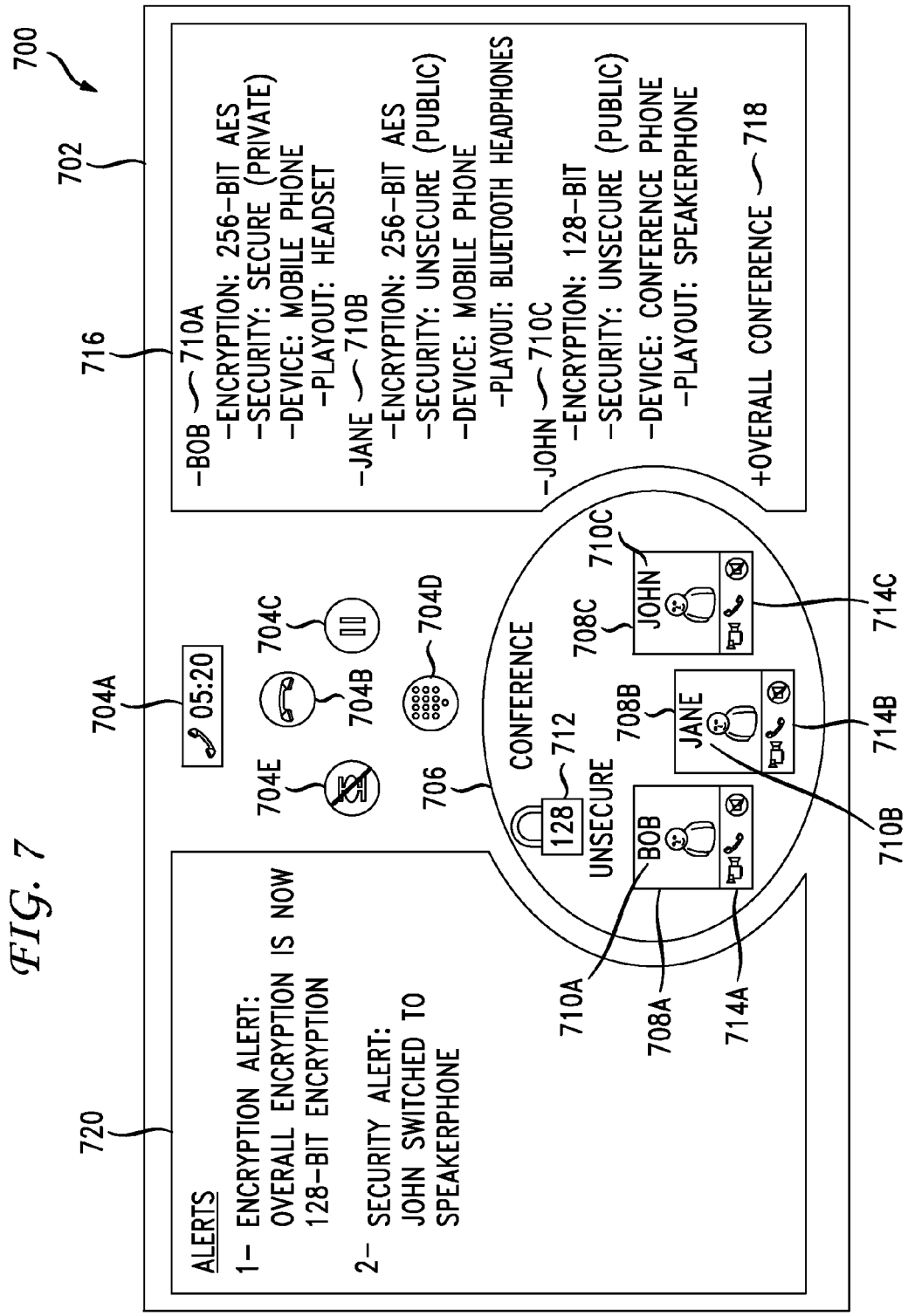
FIG. 7 illustrates an exemplary encryption and security display scheme.

FIG. 7 illustrates an exemplary encryption and security display scheme 700 at an endpoint. The encryption and security display scheme 700 is displayed on a screen 702 at an endpoint. In other aspects, the encryption and security display scheme 700 can be projected on an object, such as a screen or a wall, using a video projector, for example. The encryption and security display scheme 700 includes call features 704A-E, which provide various functions to allow a participant to interact with the conference call. In this example, feature 704A provides the status and length of the conference call, feature 704B is an end button which allows the participant to end the conference call, feature 704C allows the participant to pause the conference call, feature 704D is a virtual key pad which allows the participant to interact with the conference call, and feature 704E allows the participant to mute and unmute the conference call.

The encryption and security display scheme 700 includes a conference representation 706, which provides a representation of the conference call. The conference representation 706 provides user representations 708A-C of the participants 710A-C in the call. Each of the participants 710A-C can be represented by a list, a title, a heading, an image, an icon, a thumbnail, a graphical element, a video, an animation, a text, an object, a name, a shape, a picture, a file, a sound clip, etc. The user representations 708A-C can include features 714A-C for initiating a function for a respective participant. For example, features 714A-C can provide the functionality for initiating a video session with the respective participant, ending the call with the respective participant, adding the respective participant as a contact, emailing the respective participant, chatting with the respective participant, etc.

The conference representation 706 also provides an indication 712 of the encryption and security status of the conference call. The indication 712 illustrates the encryption status of the conference call using a padlock. If the conference call is determined to be encrypted, the indication 712 can include a locked padlock to illustrate that the conference call is encrypted. If the conference call is determined to be unencrypted, the indication 712 can include an unlocked padlock to illustrate that the conference call is unencrypted. In other aspects, the indication 712 can illustrate the encryption status of the conference call using other types of objects, images, icons, graphical elements, symbols, characters, numbers, etc. The padlock can display a number representing the encryption strength of the conference call. The padlock can also illustrate the encryption strength of the conference call based on various attributes. For example, the padlock can use colors to indicate the encryption strength. To illustrate, the padlock can be shown in green to indicate that 256-bit Advanced Encryption Standard (AES) is used for media encryption, and orange to indicate a 128-bit encryption status. As another example, the padlock can be sized according to an encryption strength to indicate the specific encryption strength. Here, a smaller padlock can be illustrated to indicate a lower encryption strength, for example. Furthermore, a respective padlock can similarly be displayed in each of the user representations 708A-C to reflect the encryption status associated with each of the respective participants 710A-C.

The indication 712 also provides a representation of the security status of the conference call. If any of the participants 710A-C in the conference call is using a speakerphone, the indication 712 illustrates the conference call as not secure. For example, the indication 712 can include a label, such as "unsecure," indicating that the conference call is not secure. If none of the participants 710A-C in the conference call are using a speakerphone, the indication 712 illustrates the conference call as secure. In other aspects, the indication 712 illustrates the conference call as secure or not secure based on other objects, images, labels, icons, thumbnails, characters, symbols, numbers, figures, graphical elements, etc.

The encryption and security display scheme 700 also includes a conference roster 716. The conference roster 716 can provide a list of the participants 710A-C and the encryption and security status of each participant. For example, the conference roster 716 can display, for each participant, the encryption status of the participant, the strength of any encryption used by the participant, a type of encryption used by the participant, a security level of the participant, and/or a local playback sound device used by the participant. The security of the participant can be based on the local playback sound device used by the participant. The security of the participant can also be based on a profile, a setting, a topic, a subject, an input, etc. The list of the participants 710A-C can be expanded to display additional details, such as a participant's location, a participant's address, a participant's history, etc. The conference roster 716 can also list the overall conference 718. The overall conference 718 can include end-to-end details about the conference. For example, the overall conference can be expanded to display the end-to-end topology of the conference, encryption details in the conference, recording details in the conference, etc.

Moreover, the encryption and security display scheme 700 displays an announcement 720 with alerts that indicate encryption and/or security changes in the conference call. For example, the announcement 720 can include an alert indicating a security change when a participant switches from a headset to a speakerphone. In other aspects, the encryption and security display scheme 700 provides an audible alert or announcement when a change in security and/or encryption occurs. For example, the endpoints in a communication session can play an audible alert to let the participants know of a change in an encryption and/or security status.

Having disclosed some basic system components and concepts, the disclosure now turns to the exemplary method embodiment shown in FIG. 8. For the sake of clarity, the method is discussed in terms of an exemplary system 100, as shown in FIG. 1, configured to practice the method. The steps outlined herein are exemplary and can be implemented in any combination thereof, including combinations that exclude, add, or modify certain steps.

The system 100 first collects RTCP messages associated with a communication session, wherein the RTCP messages are generated by devices in the communication session, and wherein the RTCP messages include security information associated with the communication session (800). The RTCP messages can also include a differentiated services trace, a global session identifier, a transcoding and gain table, signal strength, a topology, an access mode, an RTCP packet, encryption information, hardware information, hop-by-hop information, network characteristics, user information, device capabilities, protocol information, session characteristics, etc. Moreover, the security information can include security factors, such as device capabilities, protocol information, user identity, encryption status, record status, encryption strength, encryption characteristics, network topology, authentication information, playout device characteristics, communication attributes, hardware information, security protections, traffic statistics, access mode, etc.

The RTCP messages can be configured to propagate along the communication session. To this end, the RTCP messages can include instructions for relaying the RTCP messages. Further, each of the devices in the communication session can be configured to relay a respective RTCP message along the communication session. Each of the devices in the communication session can also be configured to relay a respective RTCP message to a central location. In addition, each of the devices in the communication session can collect one or more RTCP messages from other devices in the communication session and/or a central location.

Next, based on the RTCP messages, the system 100 determines a security status associated with the communication session (802). The security status can include an encryption status, an encryption strength, an encryption type, a privacy indication, an information sensitivity, an authentication status, a recording status, an authorization status, an identity, a network property, a communication property, a device property, a security level, a threat level, a physical security, playout device characteristics, protocol information, session characteristics, etc. Moreover, the security status can correspond to the overall communication session and/or a path in the communication session. The security status can also correspond to a participant in the communication session. In one aspect, the system 100 determines a respective security status for each participant in the communication session based on the RTCP messages.

The system 100 can also generate an indication of the encryption and/or security status associated with the communication session. Moreover, the system 100 can also generate an indication as to whether the communication session is being recorded. The indication can include an alert, a sound, an image, a diagram, a report, a display, a feature, a response, a message, a visual representation, a multimedia presentation, a list, a description, a summary, a file, a record status, a modified graphical element, an announcement, an animation, an emphasis, an attribute, an icon, a video, a label, a file, a character, a symbol, a number, etc. The indication can also include a modification, such as a change to a characteristic of a video, a sound, a text, a character, a symbol, a number, and/or an image. Further, the system 100 can play, display, present, transmit, and/or output the indication, for example. The system 100 can display the indication on the system 100, project the indication on an object, and/or transmit the indication to another device for display. For example, the system 100 can display a representation of the security status of the communication session on a screen.

The indication can be generated and/or displayed according to a display scheme. The display scheme can define various aspects of the indication and/or how the indication is displayed. For example, the display scheme can provide an outline, a structure, a pattern, a format, a condition, an attribute, an instruction, an element, an order, an arrangement, an organization, etc., of the indication and/or a display of the indication. The indication can also be generated according to an algorithm for determining an encryption and/or security status. The algorithm can define how to determine if the communication session is encrypted and/or secure. In one embodiment, the algorithm defines that the communication session is encrypted if every media leg and media path in the communication session is encrypted. The algorithm also specifies that the encryption level of the communication session is based on the lowest encryption level of the media legs and media paths in the communication session. Moreover, the algorithm specifies that the communication session is secure if none of the endpoints in the communication session are using a speakerphone.

Furthermore, the system 100 can determine when a change in an encryption and/or security status occurs. To determine if a change has occurred, the system 100 can monitor the encryption and/or security status of the communication session. The system 100 can also receive RTCP updates indicating a change in an encryption and/or security status. Moreover, the system 100 can provide alerts and/or announcements when a change in an encryption and/or security status occurs. For example, the system 100 can provide an alert when a participant switches from a headset to a speakerphone. As another example, the system 100 can provide an alert when an unencrypted device joins the communication session. The alert can be an audible alert, a visual alert, a message, an animation, an icon, and so forth.

The system 100 can collect the real-time transport control protocol messages in response to a triggering event. Similarly, the system can determine the security status and/or generate the indication in response to a triggering event. A triggering event can include, for example, a request, a network change, a configuration, a software and/or hardware change, a task, a rule, a command, a communication, a media problem, a signal, a setting, a transmission, a parameter, a flag, a signal, a threshold, a status, a schedule, a message, an acknowledgment, an instruction, an alert, an error, an input, and so forth.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
   collecting, via a microprocessor, a plurality of real-time transport control protocol messages originating from a plurality of communication endpoints participating in a communication session, and wherein each of the plurality of real-time transport control protocol messages comprises security information provided by a respective communication endpoint from the plurality of communication endpoints participating the communication session;
   based on the plurality of real-time transport control protocol messages, determining, via the microprocessor, for each communication endpoint from the plurality of communication endpoints participating in the communication session, a respective security status of a respective media segment connecting the respective communication endpoint to the communication session, to yield a plurality of communication endpoint security statuses; and
   determining, via the microprocessor, an overall security status associated with the communication session based on the plurality of communication endpoint security statuses of the respective media segment connecting the respective communication endpoint to the communication session.

2. The method of claim 1, further comprising generating, by the microprocessor, an indication of the overall security status, wherein the indication comprises one of an alert, a sound, an image, a report, a message, a visual representation, a multimedia presentation, an announcement, a description, or a summary.

3. The method of claim 2, wherein the indication is based on a display scheme.

4. The method of claim 1, wherein the real-time transport control protocol messages are collected from at least one of a centralized device or a regional collecting device, and wherein the real-time transport control protocol messages are transmitted from the at least one of the centralized device or the regional collecting device to a communication endpoint in the communication session in response to at least one of a query and a triggering event.

5. The method of claim 1, further comprising generating a representation of the overall security status.

6. The method of claim 1, wherein the overall security status comprises of an encryption status, an encryption status, an encryption strength, playout device characteristics, or a security level.

7. The method of claim 1, wherein the overall security status is an end-to-end security status of the communication session.

8. The method of claim 7, wherein the security status of each of the respective communication endpoints is specific to a communication path used by the respective communication endpoint to participate in the communication session.

9. The method of claim 1, further comprising, based on the real-time transport control protocol messages, determining, by the microprocessor, a respective security status for each of the plurality of communication endpoints participating in the communication session.

10. The method of claim 1, wherein each of the plurality of communication endpoints in the communication session relays a respective real-time transport control protocol message from the real-time transport control protocol messages along the communication session.

11. The method of claim 1, wherein the real-time transport control protocol messages propagate along the plurality of communication endpoints in the communication session based on a real-time transport control protocol message extension comprising an instruction to propagate the real-time transport control protocol messages.

12. The method of claim 1, wherein the real-time transport control protocol messages further comprise instructions for relaying the real-time transport control protocol messages.

13. The method of claim 1, wherein collecting the real-time transport control protocol messages is based on a triggering event comprising a user input.

14. The method of claim 1, wherein the real-time transport control protocol messages further comprise one of a differentiated services trace, a global session identifier, a transcoding and gain table, a topology, an access mode, encryption information, hardware information, hop-by-hop information, or information related to network characteristics.

15. A system comprising:
   a microprocessor; and
   a memory having stored therein instructions which, when executed by the microprocessor, cause the microprocessor to perform operations comprising:
      collecting a plurality of real-time transport control protocol messages originating from a plurality of communication endpoints participating in a communication session, and wherein each of the plurality of real-time transport control protocol messages comprises security information provided by a respective communication endpoint from the plurality of communication endpoints participating in the communication session;
      based on the plurality of real-time transport control protocol messages, determining, for each communication endpoint from the plurality of communication endpoints participating in the communication session, a respective security status of a respective media segment connecting the respective communication endpoint to the communication session, to yield a plurality of communication endpoint security statuses; and
      determining an overall security status associated with the communication session based on the plurality of communication endpoint security statuses of the respective media segment connecting the respective communication endpoint to the communication session.

16. The system of claim 15, wherein the memory further stores instructions which, when executed by the microprocessor, result in an operation further comprising generating an indication of the overall security status associated with the communication session.

17. The system of claim 15, wherein the real-time transport control protocol messages propagate along the communication session based on an instruction included in the real-time transport control protocol messages.

18. A computer-readable storage device having stored therein instructions which, when executed by a microprocessor, cause the microprocessor to perform a method comprising:
- collecting a plurality of real-time transport control protocol messages originating from a plurality of communication endpoints participating in a communication session, and wherein each of the plurality of real-time transport control protocol messages comprises security information provided by a respective communication endpoint from the plurality of communication endpoints participating in the communication session;
- based on the plurality of real-time transport control protocol messages, determining, for each communication endpoint from the plurality of communication endpoints participating in the communication session, a respective security status of a respective media segment connecting the respective communication endpoint to the communication session, to yield a plurality of communication endpoint security statuses; and
- determining an overall security status associated with the communication session based on the plurality of communication endpoint security statuses of the respective media segment connecting the respective communication endpoint to the communication session.

19. The non-transitory computer-readable storage device of claim 18, the instructions which, when executed by the microprocessor, cause the microprocessor to perform an operation further comprising generating an indication of the overall security status associated with the communication session.

20. The non-transitory computer-readable storage device of claim 18, wherein the real-time transport control protocol messages propagate along the communication session based on an instruction provided in an extension of the real-time transport control messages.

* * * * *